United States Patent [19]

George et al.

[11] 4,073,508
[45] * Feb. 14, 1978

[54] ADJUSTABLE TRAILER HITCH

[76] Inventors: Jimmie George, P.O. Box 212;
Charles P. Tyson, P.O. Box 191, both of, Mer Rouge, La. 71261

[*] Notice: The portion of the term of this patent subsequent to Sept. 7, 1993, has been disclaimed.

[21] Appl. No.: 706,394

[22] Filed: July 19, 1976

Related U.S. Application Data

[63] Continuation-in-part of Ser. No. 563,216, March 28, 1975, Pat. No. 3,979,138.

[51] Int. Cl.² .............................................. B60D 1/06
[52] U.S. Cl. ............................ 280/478 R; 280/491 B
[58] Field of Search .............. 280/478 R, 477, 491 B, 280/491 D, 491 R, 486, 500, 511

[56] References Cited

U.S. PATENT DOCUMENTS

| | | | |
|---|---|---|---|
| 2,386,195 | 10/1945 | Clark | 280/477 |
| 2,451,660 | 10/1948 | Clark et al. | 280/478 R |
| 2,546,531 | 3/1951 | Vutz | 280/478 R |
| 2,823,930 | 2/1958 | Cooper | 280/491 B |
| 2,898,127 | 8/1959 | Plumb | 280/478 R |
| 3,397,900 | 8/1968 | Sturges | 280/486 |
| 3,427,045 | 2/1969 | Hoock | 280/491 D |
| 3,718,347 | 2/1973 | Mann | 280/491 B |
| 3,979,138 | 9/1976 | George et al. | 280/478 R |

Primary Examiner—Philip Goodman
Assistant Examiner—John A. Pekar
Attorney, Agent, or Firm—John M. Harrison

[57] ABSTRACT

An adjustable trailer hitch which includes a frame or housing capable of being removably attached to the bumper or frame of a truck, car, or other vehicle, and a rotatable, extensible, hinged arm adapted to pivot on, extend from, and retract into the housing. The arm is formed of an inner arm and an outer arm, the former of which is pivotally pinned at one end of the housing, and is fitted with a hinge which permits the inner and outer arm to selectively fold and retract into and extend from the housing. The outer arm is fitted with a ball coupling adapted to mate with a ball receptacle mounted on the tongue or other frame member of a trailer to be towed, and can be equipped with an optional shock absorber.

24 Claims, 6 Drawing Figures

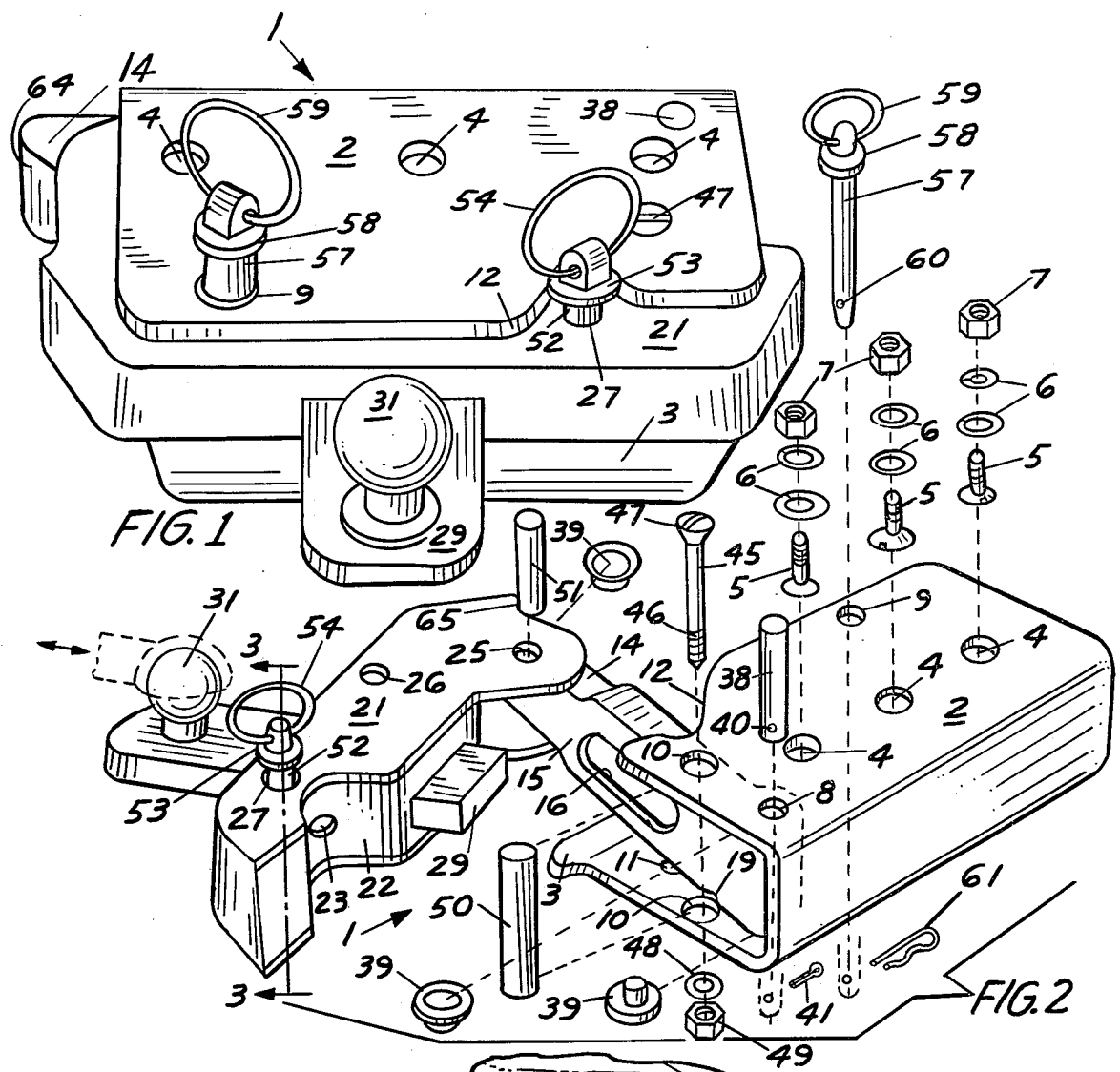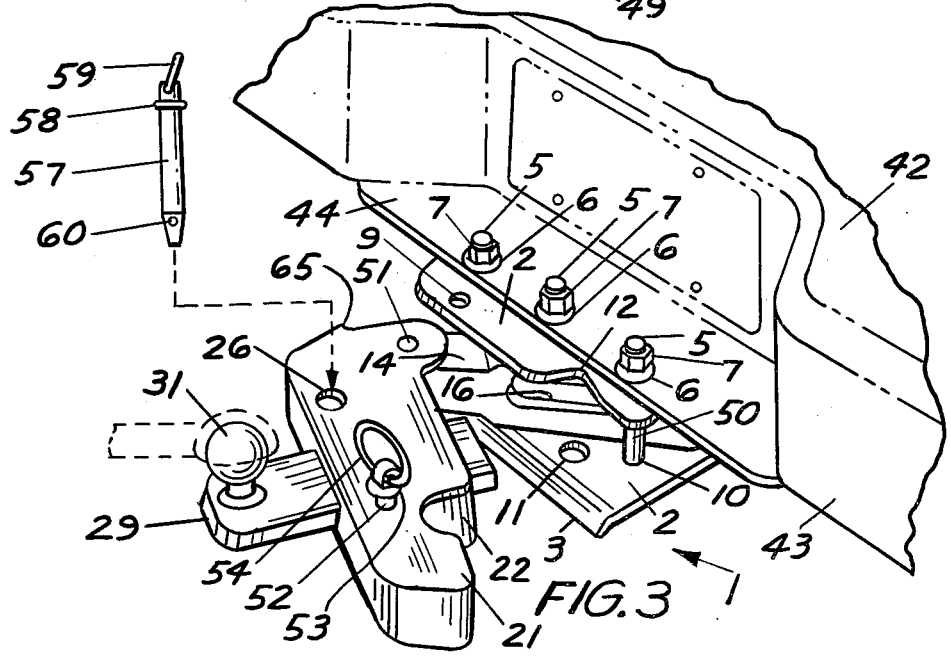

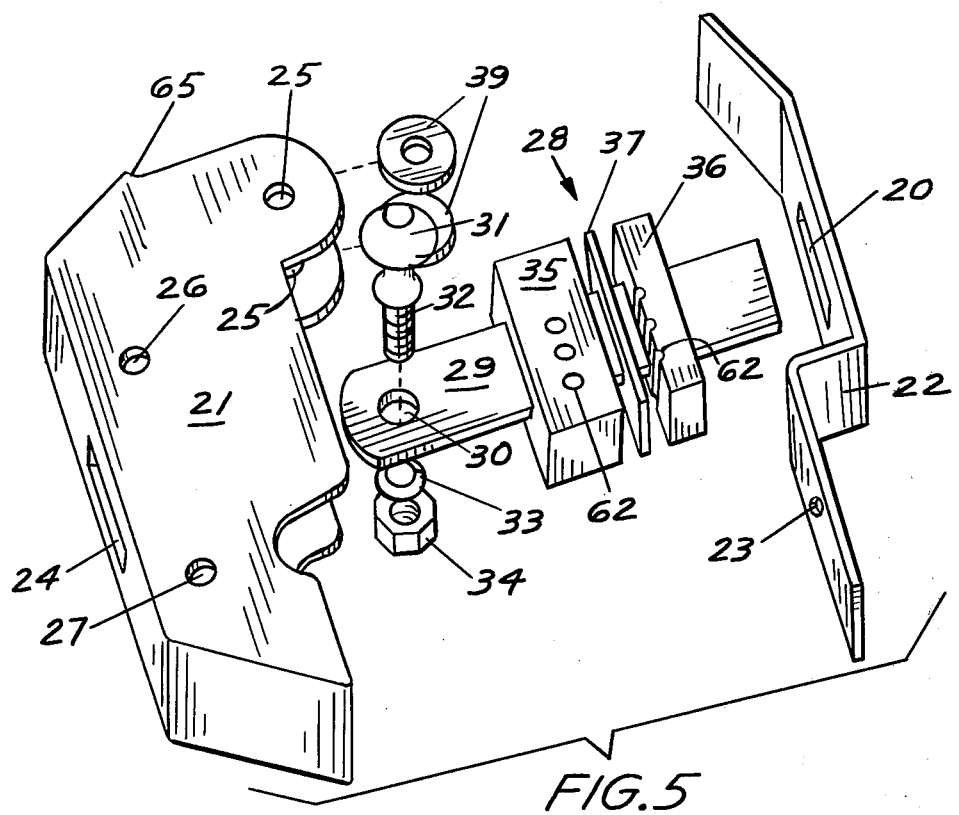
FIG.5
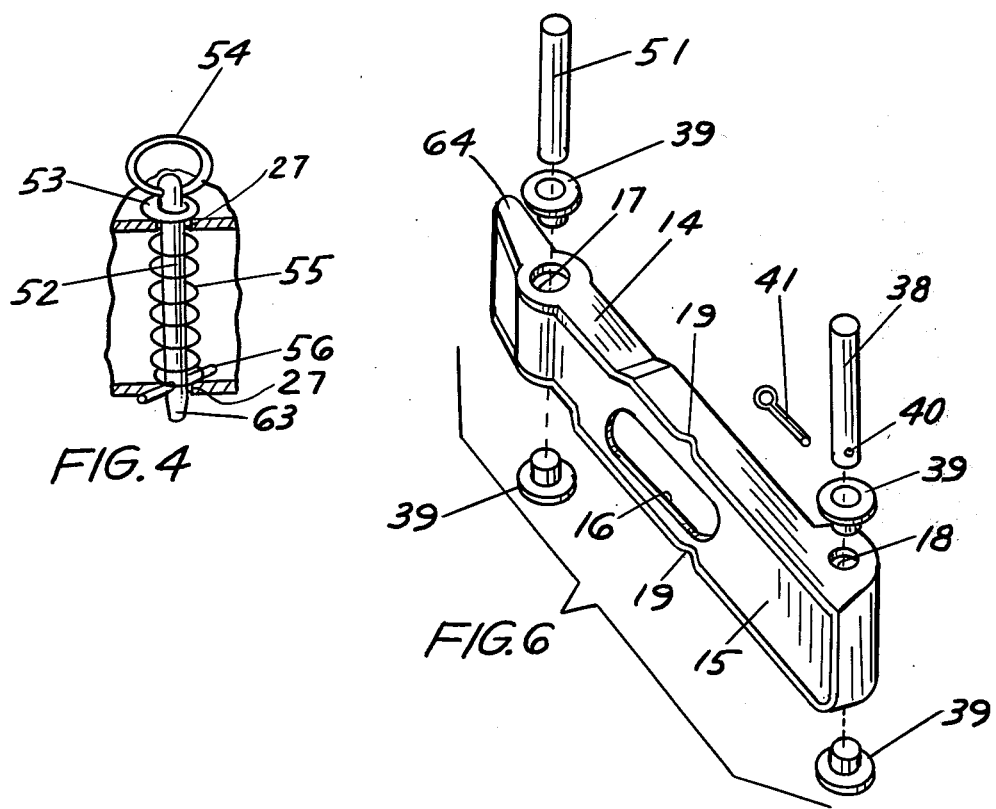
FIG.4
FIG.6

ADJUSTABLE TRAILER HITCH

CROSS REFERENCES TO RELATED APPLICATIONS

This application is a continuation-in-part of copending application Ser. No. 563,216, filed Mar. 28, 1975 now U.S. Pat. No. 3,979,138.

BACKGROUND OF THE INVENTION

1. Field of the Invention

This invention relates to a new and improved trailer hitch, and more particularly, to a new and improved adjustable trailer hitch which may be removably fitted to substantially any trailer with a minimum of maneuvering of the vehicle to which the hitch is attached. The device can be removably mounted to the bumper of a car, truck or other vehicle and is fitted with a rotatable, hinged arm which is itself extensible and retractable to permit locking of the ball carried by the arm to the trailer ball receptacle when the trailer is located in substantially any position within reach of the extended arm on the hitch.

2. Description of the Prior Art

Heretofore, various trailer hitches have been designed to removably lock to the ball receptacle of a trailering vehicle, such as a boat or cattle trailer. Most of these hitches are mounted in fixed relationship to the towing vehicle and cannot be removed from the vehicle without undergoing an extensive unbolting procedure. Furthermore, these hitches are characteristically mounted with the carrying ball very close to the vehicle frame, and the vehicle must, therefore, necessarily be backed very close to and in precise alignment with the trailer tongue in order to effect proper coupling of the trailer to the hitch. As a result, during the backing operation the vehicle is frequently damaged by bumping the trailer tongue, and unless the ball attached to the hitch is in perfect alignment with the trailer ball receptacle, the receptacle will not lock positively onto the ball and extensive additional maneuvering of the vehicle or trailer tongue is frequently necessary to achieve a firm and positive lock. This problem is, of course, intensified under circumstances where there is a large load on the trailer tongue, or where the trailer is in an inaccessible position which prevents ready maneuvering of the trailer ball receptacle into alignment with the ball located on the hitch.

Many attempts have been made to develop an adjustable trailer hitch equipped with a ball which may be extended and retracted from the vehicle frame in order to minimize the problem of hitch-to-trailer alignment. These efforts have chiefly taken the form of connectors which are telescoping in nature, and which may be lengthened or shortened as desired by the removal and insertion of pins from a telescoping ball-carrying member. However, many of these devices are functionally limited since the ball can be moved only on a single axis extending to and from the vehicle frame. Accordingly, if after a towing vehicle is backed up the ball receptacle is located on an axis not in line with the extension and retraction axis, then the same problem of maneuvering the ball receptacle on the trailer into alignment with the ball on the trailer hitch is presented. Furthermore, the telescoping hitch is subject to the disadvantage of rusting and caking with dirt, which impedes the telescoping operation.

Accordingly, an object of the invention is to provide an extensible and retractable trailer hitch which is designed to fit on substantially all existing truck bumpers without the necessity of modifying the bumpers.

Another object of this invention is to provide an improved adjustable trailer hitch, the locking mechanism of which is capable of being initially extended independently of the carrying vehicle to cooperate with the locking apparatus of a trailer, and subsequently retracted into towing configuration.

Another object of the invention is to provide an adjustable trailer hitch which is capable of being extended, removably attached to a trailer, and retracted by first extending the hitch by moving the vehicle forward, and subsequently backing the towing vehicle to effect retraction of the hitch into towing configuration.

Still another object of this invention is to provide an improved adjustable trailer hitch which may be optionally fitted with a shock absorber, the ball of which hitch may be coupled with a ball receptacle located on a trailer under circumstances where the ball receptacle is located in substantially any position within the extension range of the ball from the hitch.

Yet another object of this invention is to provide an improved adjustable trailer hitch which is characterized by great strength and which permits positive locking of the ball and/or other locking mechanism located on the adjustable portion of the hitch with a ball receptacle or alternative mating receptacle of a trailer without the necessity of additionally maneuvering the ball receptacle with respect to the ball, or the carrying vehicle with respect to the ball receptacle, after the ball and ball receptacle have been initially positioned within a predetermined distance of each other.

A further object of the invention is to provide an improved trailer hitch capable of being fitted with an optional built-in shock absorber, which hitch is characterized by a hinged, folding outer arm and inner arm that permits maneuvering of a lock means on the outer arm into locking position with respect to a mating lock receptacle located on the tongue or frame of a trailer after the vehicle carrying the trailer hitch has been backed into position such that the trailer lock receptacle is within extension range of the adjustable lock means located on the outer arm.

A still further object of the invention is to provide an improved adjustable trailer hitch having an optional shock absorbing function and a hinged outer arm and inner arm capable of extending from and folding into a frame or housing, the ball and/or alternative locking mechanism of which trailer hitch can be maneuvered into substantially any position within the range of the extended outer arm of the hitch after the vehicle carrying the hitch is backed into close proximity to a trailer, the ball and/or alternative locking mechanism subsequently locked onto a ball or alternative receptacle located on the trailer, and the adjustable trailer hitch then automatically retracted into towing configuration by initially pulling the vehicle forward and then backing the vehicle carrying the hitch to lock the hitch into towing configuration.

Another object of this invention is to provide a new and improved adjustable trailer hitch having a pair of arms connected by a cooperating hinge, one of the arms being pivotally attached to the hitch frame or housing and the other carrying a ball or alternative locking mechanism, which locking mechanism can be maneuvered within a specified, selected distance of a ball and/or alternative mating receptacle on a trailer, and subsequently adjusted to positively lock the ball or alternative locking mechanism to the receptacle without the necessity of further maneuvering the vehicle with respect to the trailer.

Yet another object of this invention is to provide an adjustable trailer hitch having a hinged, folding arm, one end of which arm may be optionally equipped with a shock absorber and the other end of which is removably and retractably mounted on the bumper or frame of a truck, automobile, motor home or other vehicle, to occupy minimum of space when in folded or retracted position.

A still further object of the invention is to provide an adjustable trailer hitch equipped with an inner arm and an outer arm connected by a hinge, the inner arm of which is in pivotal cooperation with the hitch frame or housing and the outer arm of which is fitted with a ball coupling or alternative coupling mechanism and which is capable of receiving a shock absorber, which trailer hitch may be initially bolted or otherwise attached to the rear or front of a vehicle; the vehicle maneuvered into position with respect to a trailer; the ball coupling locked onto the trailer; the vehicle pulled forward to fully extend the trailer hitch arm; the vehicle then backed to effect automatic positive retraction of the arms into the hitch housing; and the trailer subsequently towed without the necessity of manually locking the hitch into retracted position.

SUMMARY OF THE INVENTION

These and other objects of the invention are provided in a new and improved adjustable trailer hitch which includes the following elements:

1. A frame or housing capable of being permanently or removably mounted on the bumper or other frame member of a vehicle;

2. An arm pivoted to the housing at one end thereof and having a hinge in the approximate center to form an inner arm and an outer arm whereby the inner arm and outer arm can be extended from the housing and retracted back into the frame as desired;

3. Means in cooperation with the free end of the outer arm for mating with and positively locking to a cooperating mechanism on a trailer to be towed, upon extension of the arm from the housing; and 4. Locking means for securing the arm into retracted position in the housing to achieve a desired pulling or towing configuration of the hitch.

BRIEF DESCRIPTION OF THE DRAWING

The invention will be better understood in view of the following description presented with reference to the accompanying drawings:

FIG. 1 of the drawings is a perspective view of the adjustable trailer hitch of this invention illustrated in retracted position;

FIG. 2 is a perspective view of the adjustable trailer hitch illustrated in FIG. 1 in extended configuration;

FIG. 3 is a perspective view of the adjustable trailer hitch illustrated in FIGS. 1 and 2 in extended configuration and mounted on the bumper of a truck;

FIG. 4 is a sectional view of the latch pin assembly for locking and releasing the arm in the housing of the trailer hitch illustrated in FIGS. 1-3;

FIG. 5 is an exploded view of the outer arm of the trailer hitch illustrated in FIGS. 1-3 with an optional shock absorber built into the outer arm; and FIG. 6 is a perspective view of the inner arm of the trailer hitch illustrated in FIGS. 1-3.

DESCRIPTION OF THE PREFERRED EMBODIMENTS

Referring now to FIG. 1 of the drawings, the adjustable trailer hitch of this invention, generally illustrated by reference numeral 1 is shown locked in retracted position. Housing 2 is designed to accommodate inner arm 14 and outer arm 21 in folding configuration, as illustrated. Housing 2 is also equipped with housing lip 3, the function of which will be hereinafter described, and housing mounting apertures 4, which are adapted to receive housing mounting bolts 5, illustrated in FIG. 2 of the drawings. Housing mounting washers 6 and housing mounting nuts 7 cooperate with mounting bolts 5 and facilitate bolting housing 2 to the frame or bumper of a vehicle, as illustrated in FIG. 3 of the drawings.

Referring now particularly to FIG. 2 of the drawings, inner arm 14 and outer arm 21 cooperate in pivotal fashion by means of hinge pin 51, which is in registration with outer arm hinge aperture 25 and inner arm hinge aperture 17, more particularly illustrated in FIG. 6 of the drawings. In FIG. 2, inner arm 14 and outer arm 21 are illustrated in extended configuration from within housing 2. Inner arm 14 is in turn hingedly connected to housing 2 by means of pivot pin 38 and cooperating housing pivot pin aperture 8 and inner arm pivot aperture 18. Thus, it will be appreciated from a consideration of FIGS. 1-3 of the drawings that both inner arm 14 and outer arm 21 may be releasably secured in folded relationship inside housing 2 and extended from housing 2 as desired. It will also be appreciated that the pivoting relationship between inner arm 14 and outer arm 21, and between inner arm 14 and housing 2 is enhanced by inserts 39 which are positioned between inner arm 14 and outer arm 21, and between inner arm 14 and frame 2, respectively. Inserts 39 are designed to snap into inner arm hinge apertures 17 and inner arm pivot apertures 18, as illustrated in FIGS. 2 and 6 of the drawings to reduce friction, not only on the matching outer arm 21 and inner arm 14 surfaces and the inner arm 14 and housing 2 surfaces, but also on the hinge pin 51 and pivot pin 38 surfaces. Inserts 39 are also preferably formed of a non-corrosive material such as polyethylene, Teflon, Debrin, or other material known to those skilled in the art, since they may be subjected to a corrosive environment as the trailer hitch is used. Furthermore, pivot pin 38 can be biased in position in housing pivot pin aperture 8 and registering inner arm pivot aperture 18 by means of pivot pin aperture 40 and cooperating cotter pin 41 adapted to be fitted into pivot pin aperture 40.

Inner arm 14 and outer arm 21 are releasably secured inside housing 2 by means of latch pin 52, equipped with latch pin head 53, latch pin ring 54, latch pin spring 55 and latch pin spring retainer 56 as illustrated in FIG. 1 and detailed in FIG. 4 of the drawings. Referring again to FIG. 2, latch pin 52 fits in outer arm latch aperture 27 and is designed to secure inner arm 14 and outer arm 21 inside housing 2 in spring loaded fashion by mating with housing latch pin aperture 11 in the bottom plate of housing 2 when inner arm 14 and outer arm 21 are retracted inside housing 2. Latch pin tip 63 is preferably rounded or bevelled as illustrated in FIG. 4, to cause latch pin 52 to move upwardly against the bias of latch pin spring 55 when latch pin tip 63 contacts housing lip 3 as outer arm 21 closes into housing 2. Housing slot 12 is provided in the top plate of housing 2 to accommodate latch pin 52 when inner arm 14 and outer arm 21 are in retracted configuration, as illustrated in FIG. 1 of the drawings.

When it is desired to extend inner arm 14 and outer arm 21 from housing 2, it is necessary to initially remove safety pin 57, the features of which are hereinafter described, and to force latch pin 52 upwardly against the bias of latch pin spring 55 by grasping latch pin ring 54 and pulling, in order to disengage latch pin 52 from housing latch pin aperture 11 and free inner arm 14 and outer arm 21 from locked positions inside housing 2.

Referring again to FIG. 2 of the drawings, when inner arm 14 and outer arm 21 are positioned within housing 2, safety pin 57, fitted with safety pin head 58, safety pin ring 59, safety pin aperture 60 and safety pin retainer 61 can be fitted in housing safety pin aperture 9 and registering outer arm safety pin aperture 26 to insure that inner arm 14 and outer arm 21 will remain within housing 2 after a load is placed on ball coupling 31 in the towing operation. Of course, it will be recognized that if safety pin 57 is in position while inner arm 14 and outer arm 21 are secured inside housing 2, it too must be removed from housing safety pin aperture 9 and registering outer arm safety pin aperture 26 by initially removing safety pin retainer 61 from safety pin aperture 60 in safety pin 57, grasping safety pin ring 59, and pulling upwardly in order to remove safety pin 57 and effect extension of inner arm 14 and outer arm 21 from housing 2.

It will be appreciated that inner arm 14 and outer arm 21 may be quickly and easily disassembled if replacement parts are necessary, by first removing hinge pin 51 from registering outer arm hinge aperture 25 and inner arm hinge aperture 17, and subsequently removing pivot pin 38 from registering housing pivot pin aperture 8 and inner arm pivot aperture 18. After hinge pin 51 and pivot pin 38 have been removed, inner arm 14 can be removed from cooperation with housing 2 and outer arm 21, and the appropriate parts replaced, as desired.

As illustrated in FIGS. 1–3 and 5 of the drawings, tongue 29 is fitted through outer arm tongue aperture 24 in outer arm 21, and if shock absorber 28 is not included, tongue 29 is secured to outer arm 21 at outer arm tongue aperture 24, preferably by welding. Outer arm plate 22 is likewise fitted with outer arm plate tongue aperture 20, to receive tongue 29 and to additionally secure tongue 29 in place, preferably by welding. Tongue 29 carries ball coupling 31 by means of ball coupling aperture 30, and may also be fitted with an alternative locking mechanism such as a second aperture to receive a pin when it is desired to tow a trailer having a clevis coupling or similar mechanical coupling arrangement. Ball coupling 31 may be removably secured to tongue 29 in conventional fashion by means of ball coupling washer 33 and ball coupling nut 34, the latter of which is threaded on ball coupling bolt 32.

Referring again to FIGS. 2 and 3 of the drawings it will be appreciated that the pivotal extension of inner arm 14 from within housing 2 is limited by contact with stop bolt sleeve 50, which cooperates with stop bolt 45, fitted with stop bolt threads 46, and slotted stop bolt head 47. Stop bolt 45 is secured in housing stop bolt aperture 10 by means of stop bolt washer 48 and stop bolt nut 49. Stop bolt sleeve 50 is designed to fit concentrically over stop bolt 45, and serves a dual purpose in the trailer hitch of this invention; it serves to prevent inner arm 14 from moving past a predetermined point when inner arm 14 and outer arm 21 are extended from housing 2, and as heretofore noted, it helps prevent frame 2 from crushing, upon application of a load on housing 2.

Extension of outer arm 21 with respect to inner arm 14 is also limited to an acute angle by means of inner arm elbow stop 64 and outer arm elbow stop 65, which touch at full extension of outer arm 21 with respect to inner arm 14 and prevent additional extension thereof. This configuration, in cooperation with stop bolt sleeve 50 and stop bolt 45, permits retraction of outer arm 21 and inner arm 14 inside housing 2 after ball 31 is coupled to a trailer and the vehicle carrying trailer hitch 1 is backed up to effect a secured folding of outer arm 21 and inner arm 14.

As illustrated in FIG. 3 of the drawings, housing 2 is fitted to vehicle 42 on vehicle bumper 43 by means of vehicle bumper plate 44. Housing mounting bolts 5 are first positioned in housing mounting apertures 4 as heretofore noted, and then through registering apertures in vehicle bumper plate 44 as the trailer hitch is positioned under vehicle bumper plate 44. Housing mounting washers 6 and housing mounting nuts 7 are then placed on housing mounting bolts 5 to secure housing 2 onto vehicle bumper plate 44 as illustrated.

While trailer hitch 1 may be mounted to a vehicle bumper 43 by bolting as illustrated, it will be appreciated that the hitch may also be attached by welding, as desired. When the trailer hitch is mounted by means of bolts, three housing mounting bolts 5 with accompanying housing mounting washers 6 and housing mounting nuts 7 are preferred, as illustrated in the drawings; however it will be appreciated that more or fewer mounting bolts may be utilized as is deemed necessary according to load requirements for any specific situation. In like manner, trailer hitch 1 may be mounted to the frame of an automobile or other vehicle, including substantially any recreational vehicle, simply by bolting or welding, as desired.

Referring again to FIG. 5 of the drawings, it will be appreciated that outer arm 21 can be fitted with an optional shock absorber 28 if desired by equipping tongue 29 with a forward shock absorber 35, a rear shock absorber 36, and a shock absorber plate 37 positioned between forward shock absorber 35 and rear shock absorber 36, and welded to tongue 29. Optional shock absorber holes 62 may be provided in forward shock absorber 35 and rear shock absorber 36 as desired to facilitate optimum deformation of forward shock absorber 35 and rear shock absorber 36 under load. Forward shock absorber 35, rear shock absorber 36 and shock absorber plate 37 are enclosed within outer arm 21 by means of outer arm plate 22. When shock absorber 28 is in position on tongue 29 as illustrated, tongue 29 fits slidably through outer arm tongue aperture 24 in outer arm 21 and outer arm plate aperture 20 in outer arm plate 22 as outer arm plate 22 is fastened to outer arm 21, generally by welding, as illustrated. This configuration permits tongue 29 to move with respect to outer arm 21 and outer arm plate 22 as forward shock absorber 35 and rear shock absorber 36 deform under load in the towing operation. Outer arm plate aperture 23 in outer arm plate 22 is provided to service latch pin spring 55 and latch pin spring retainer 56 when replacement of repair is necessary.

It will be appreciated that shock absorber 28 may be positioned on tongue 29 in trailer hitch 1 under any circumstances where it is desirable to reduce shock loading and/or dampen the harmonic vibrations created when trailer hitch 1 is placed under certain loading conditions during towing operations. Since shock absorber plate 37 is welded to tongue 29 and is positioned between forward shock absorber 35 and rear shock absorber 36 when shock absorber 28 is positioned inside outer arm 21 and secured therein by outer arm plate 22, the shock of tension and compression loading of tongue 29 during towing are lessened as shock absorber 28 performs its function. It is significant that forward shock absorber 35 is approximately twice the thickness of rear shock absorber 36 since an unequal distribution of shock absorbing material on tongue 29 has been found to be a significant factor in dampening the harmonic vibrations set up by towing in certain specific towing applications. Forward shock absorber 35 and rear shock absorber 36 are preferably formed of rubber, but may be manufactured of substantially any material known to those skilled in the art which will deform under load in a shock absorbing action. Under circumstances where harmonic vibrations and/or shock loading are not a significant factor in using the trailer hitch of this invention, shock absorber 28 can be eliminated and tongue 29 may be welded directly to outer arm 21 and outer arm plate 22, as heretofore described.

Referring again to FIGS. 5 and 6 of the drawings, it is apparent that inner arm 14 is fitted with inner arm plate 15, equipped with inner arm slot 16 and preferably secured to inner arm 14 by welding as heretofore described. As also heretofore described, inner arm 14 fits inside outer arm 21, and inner arm hinge aperture 17 registers with outer arm hinge aperture 25 and is adapted to receive hinge pin 51 to join inner arm 14 and outer arm 21 in pivotal relationship, as illustrated in FIGS. 1–3. In like manner, inner arm 14 is adapted to fit inside housing 2 and is fitted with inner arm pivot aperture 18 which is adapted to register with housing pivot pin aperture 8 to receive pivot pin 38 and permit outer arm 21 and inner arm 14 to pivot with respect to housing 2. Inner arm pivot rest grooves 19 are provided in order to provide a firm seat upon which inner arm 14 may rest against stop bolt sleeve 50 when inner arm 14 is fully pivotally extended from within housing 2.

Having described our invention with the particularity set forth above, what is claimed is:

1. An adjustable trailer hitch comprising:
   (a) a housing;
   (b) an inner arm pivotally attached to said housing at one end of said inner arm;
   (c) an outer arm pivotally attached to the free end of said inner arm to form an elbow hinge, said inner arm and said outer arm being relatively movable about said housing and said elbow hinge, and further including stop portions in said elbow hinge to permit extension of said outer arm at no greater than an acute angle with respect to said inner arm, said outer arm and said inner arm being foldable about said elbow hinge into abutting relation with respect to each other and with respect to said housing when said inner arm and said outer arm are pivoted on said housing in retracted configuration;
   (d) lock means in cooperation with said outer arm and said housing to secure said inner arm and said outer arm in said retracted configuration; and
   (e) coupling means carried by said outer arm for coupling to a trailer to facilitate towing.

2. The trailer hitch of claim 1 further comprising stop means in cooperation with said housing to limit the degree of pivot of said inner arm with respect to said housing.

3. The trailer hitch of claim 1 wherein said inner arm is pivotally and releasably secured to said housing by a first removable pin and said free end of said inner arm is pivotally and releasably secured to said outer arm by a second removable pin.

4. The trailer hitch of claim 1 wherein said coupling means carried by said outer arm is at least a ball.

5. The trailer hitch of claim 1 wherein:
   (a) said inner arm is pivotally and releasably secured to said housing by a first removable pin and said free end of said inner arm is pivotally and releasably secured to said outer arm by a second removable pin; and
   (b) said coupling means carried by said outer arm is at least a ball.

6. The trailer hitch of claim 5 further comprising a first pair of inserts in concentric cooperation with said first removable pin and a second pair of inserts in concentric cooperation with said second removable pin to facilitate ease of pivot of said inner arm on said housing and said outer arm.

7. The trailer hitch of claim 1 wherein said lock means is a latch pin carried by said outer arm and cooperating with said housing when said inner arm and said outer arm are in retracted configuration to secure said inner arm and said outer arm in folded configuration with respect to said housing.

8. The trailer hitch of claim 1 wherein:
   (a) said lock means is a latch pin carried by said outer arm and cooperating with said housing when said inner arm and said outer arm are in retracted configuration to secure said inner arm and said outer arm in folded configuration with respect to said housing;
   (b) said inner arm is pivotally and releasably secured to said housing by a first removable pin and said free end of said inner arm is pivotally and releasably secured to said outer arm by a second removable pin; and
   (c) said coupling means carried by said outer arm is a removable ball.

9. The trailer hitch of claim 1 wherein said inner arm is pivotally attached in the interior of said housing and further comprising:
   (a) spaced apertures in said housing to receive mounting bolts for securing said trailer hitch to a vehicle; and
   (b) a first pair of inserts in said elbow hinge and a second pair of inserts in said end of said inner arm pivotally attached to said housing to facilitate ease of pivot of said inner arm on said housing and said outer arm.

10. The trailer hitch of claim 1 further comprising spaced apertures in said housing to receive mounting bolts for securing said trailer hitch to a vehicle, and wherein:
   (a) said inner arm is pivotally attached to the interior of said housing;
   (b) said lock means is a latch pin carried by said outer arm and cooperating with said housing when said inner arm and said outer arm are in retracted configuration to secure said inner arm and said outer arm in folded configuration within said housing;

(c) said inner arm is releasably pivoted inside said housing by a first removable pin and a first pair of cooperating inserts and said free end of said inner arm is releasably pivoted to said outer arm by a second removable pin and a second pair of cooperating inserts; and (d) said coupling means carried by said outer arm is a removable ball.

11. The trailer hitch of claim 1 wherein said coupling means carried by said outer arm is a tongue secured in said outer arm and fitted with a ball for receiving a cooperating trailer receptacle, and further comprising a safety pin cooperating with said housing and said outer arm to further secure said inner arm and said outer arm in retracted configuration.

12. The trailer hitch of claim 1 wherein:
(a) said outer arm is hollow and is fitted with an outer arm plate on one side thereof; and
(b) said coupling means carried by said outer arm is a tongue having a first portion slidably secured in said hollow of said outer arm and an extending portion fitted with a ball for receiving a cooperating trailer receptacle; and further comprising a shock absorber mounted on said first portion of said tongue inside said hollow of said outer arm to minimize tension and compression shock loading of said trailer hitch during towing.

13. The trailer hitch of claim 12 wherein said shock absorber comprises a first and second mass of shock absorbing material on said first portion of said tongue and a plate secured to said tongue and positioned between said first and second mass of shock absorbing material.

14. The trailer hitch of claim 1 wherein said inner arm is hollow and is closed by an inner arm plate on one side thereof and said outer arm is hollow and is closed by an outer arm plate on one side thereof to strengthen said inner arm and said outer arm.

15. The trailer hitch of claim 1 wherein:
(a) said inner arm is hollow and is pivotally and releasably secured to said housing by a first removable pin and said free end of said inner arm is pivotally and releasably secured to said outer arm by a second removable pin, said inner arm being further closed by an inner arm plate on one side thereof; and said outer arm is hollow and is closed by an outer arm plate on one side thereof to strengthen said inner arm and said outer arm;
(b) said coupling means carried by said outer arm is a tongue having a first portion slidably positioned in said hollow in said outer arm and an extending portion carrying a removable ball for receiving a cooperating trailer receptacle, and further comprising:
(c) a shock absorber in said hollow of said outer arm having a first and second block of shock absorbing material mounted on said first portion of said tongue, and a plate secured to said first portion of said tongue and positioned between said first and second block of shock absorbing material; and
(d) a first pair of inserts in concentric cooperation with said first removable pin and a second pair of inserts in concentric cooperation with said second removable pin to facilitate ease of pivot of said inner arm on said housing and said outer arm.

16. An adjustable trailer hitch comprising:

(a) a housing having a recessed frontal portion for receiving an inner arm and an outer arm in folded configuration;
(b) an inner arm pivotally attached to said housing in said recessed frontal portion at one end of said inner arm;
(c) an outer arm pivotally attached to the free end of said inner arm to form an elbow hinge, including stop portions in said elbow hinge to permit extension of said outer arm at no greater than an acute angle with respect to said inner arm, and further including stop means in said housing to limit the degree of pivot of said inner arm with respect to said housing, said inner arm and said outer arm being relatively movable about said housing and said elbow hinge and foldable about said elbow hinge to a position substantially inside said recessed frontal portion of said housing;
(d) lock means in cooperation with said outer arm and said housing for securing said inner arm and said outer arm in retracted configuration substantially inside said recessed frontal portion of said housing; and
(e) coupling means carried by said outer arm for coupling to a trailer to facilitate towing.

17. The trailer hitch of claim 16 wherein:
(a) said inner arm is pivotally and releasably secured to said housing by a first removable pin and said free end of said inner arm is pivotally and releasably secured to said outer arm by a second removable pin; and
(b) said coupling means carried by said outer arm is at least a ball.

18. The trailer hitch of claim 17 further comprising a first pair of inserts in concentric cooperation with said first removable pin and a second pair of inserts in concentric cooperation with said second removable pin to facilitate ease of pivot of said inner arm on said housing and said outer arm.

19. The trailer hitch of claim 16 wherein said coupling means is a tongue carried by said outer arm and fitted with a ball for cooperating with the ball receptacle of a trailer.

20. The trailer hitch of claim 16 wherein:
(a) said inner arm is hollow and is closed by an inner arm plate;
(b) said outer arm is hollow and is closed by an outer arm plate; and
(c) said coupling means is a tongue carried by said outer arm and having a first portion extending through said hollow in said outer arm and through said outer arm plate, said tongue having an extending portion fitted with at least a ball for cooperating with a ball receptacle of a trailer.

21. The trailer hitch of claim 20 further comprising a shock absorber mounted on said first portion of said tongue inside said hollow of said outer arm to minimize tension and compression shock loading of said trailer hitch during towing.

22. The trailer hitch of claim 21 wherein said shock absorber comprises a first and second block of shock absorbing material fitted on said first portion of said tongue and a plate secured to said first portion of said tongue and positioned between said first and second block of shock absorbing material.

23. The trailer hitch of claim 16 wherein:
(a) said inner arm is hollow and is pivotally and releasably secured to said housing by a first removable pin and said free end of said inner arm is pivotally and releasably secured to said outer arm by a second removable pin, said inner arm is further closed by an inner arm plate on one side thereof; and said outer arm is hollow and is closed by an outer arm plate on one side thereof to strengthen said inner arm and said outer arm;

(b) said coupling means carried by said outer arm is a tongue having a first portion slidably positioned in said hollow in said outer arm and an extending portion carrying a removable ball for receiving a cooperating trailer receptacle, and further comprising:

(c) a shock absorber in said hollow of said outer arm having a first and second block of shock absorbing material mounted on said first portion of said tongue, and a plate secured to said first portion of said tongue and positioned between said first and second block of shock absorbing material; and (d) a first pair of inserts in concentric cooperation with said first removable pin and a second pair of inserts in concentric cooperation with said second removable pin to facilitate ease of pivot of said inner arm on said housing and said outer arm.

24. The trailer hitch of claim 23 further comprising a safety pin cooperating with said housing and said outer arm to further secure said inner arm and said outer arm in retracted configuration.

* * * * *